No. 618,244. Patented Jan. 24, 1899.
W. C. BARR.
MOTOR VEHICLE TRUCK.
(Application filed July 19, 1898.)
(No Model.) 3 Sheets—Sheet 2.
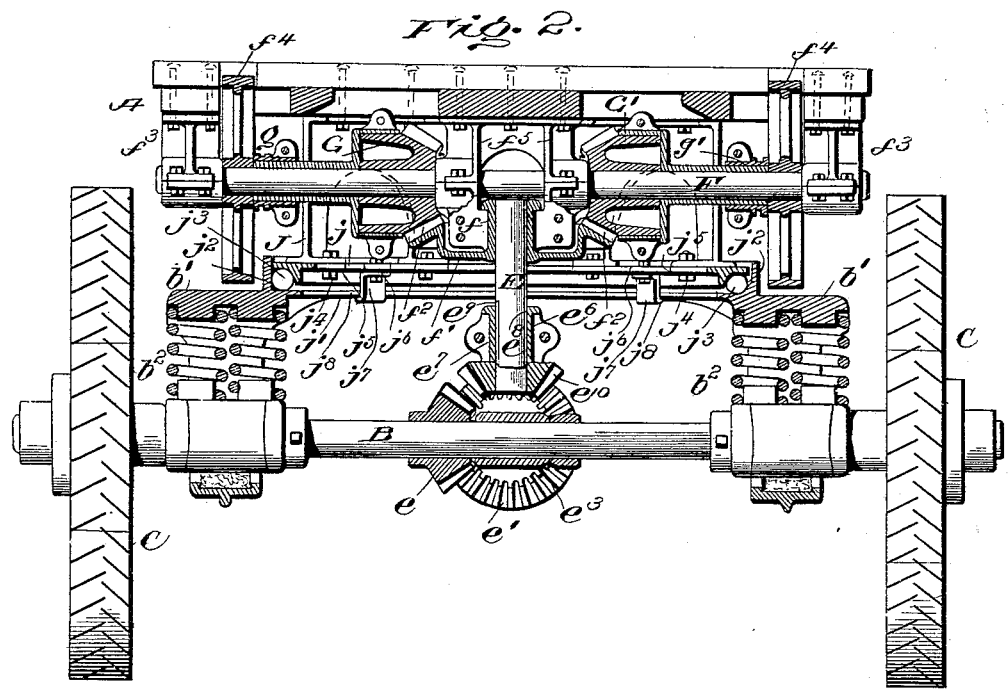

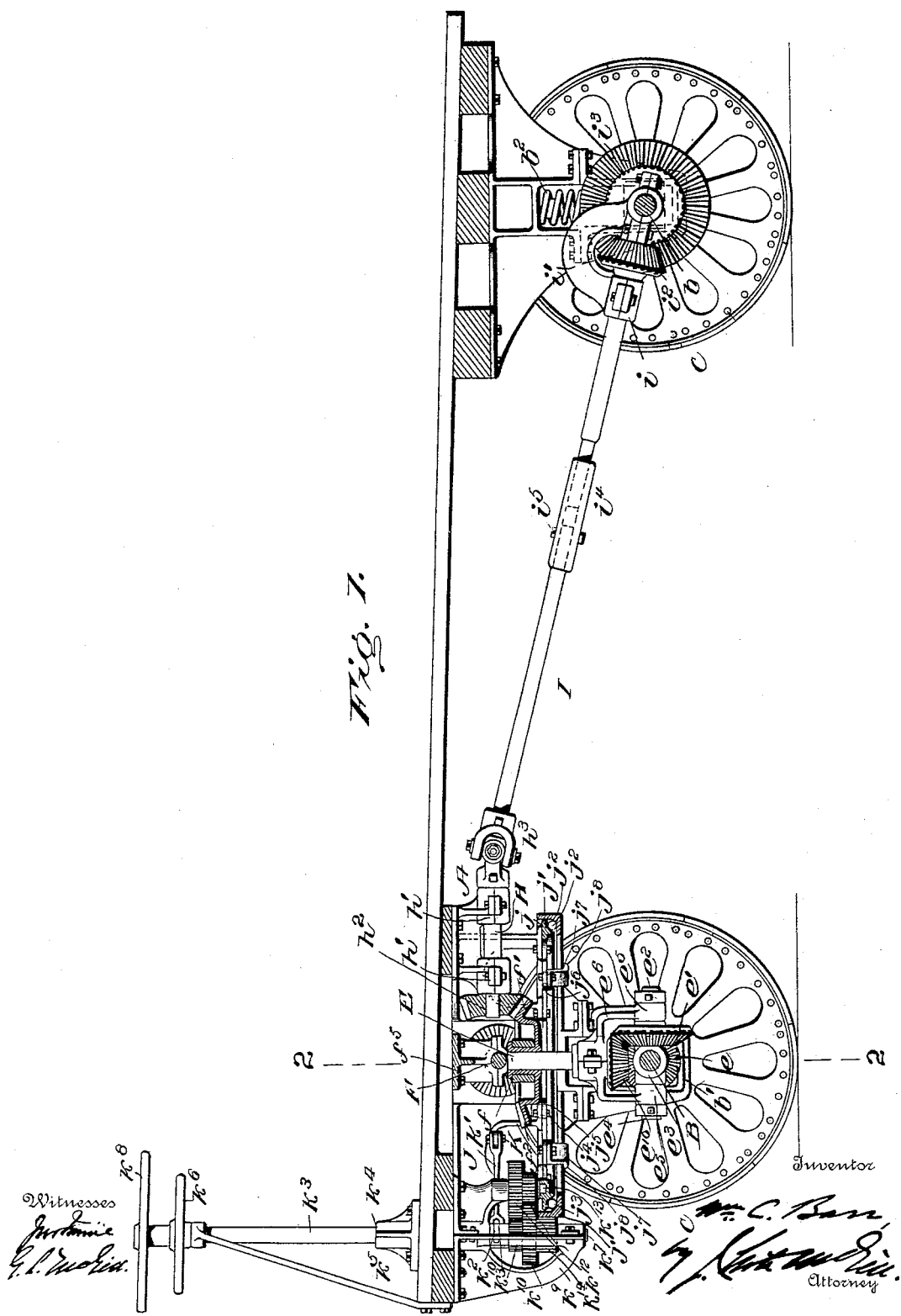

No. 618,244. Patented Jan. 24, 1899.
W. C. BARR.
MOTOR VEHICLE TRUCK.
(Application filed July 19, 1898.)
(No Model.) 3 Sheets—Sheet 3.
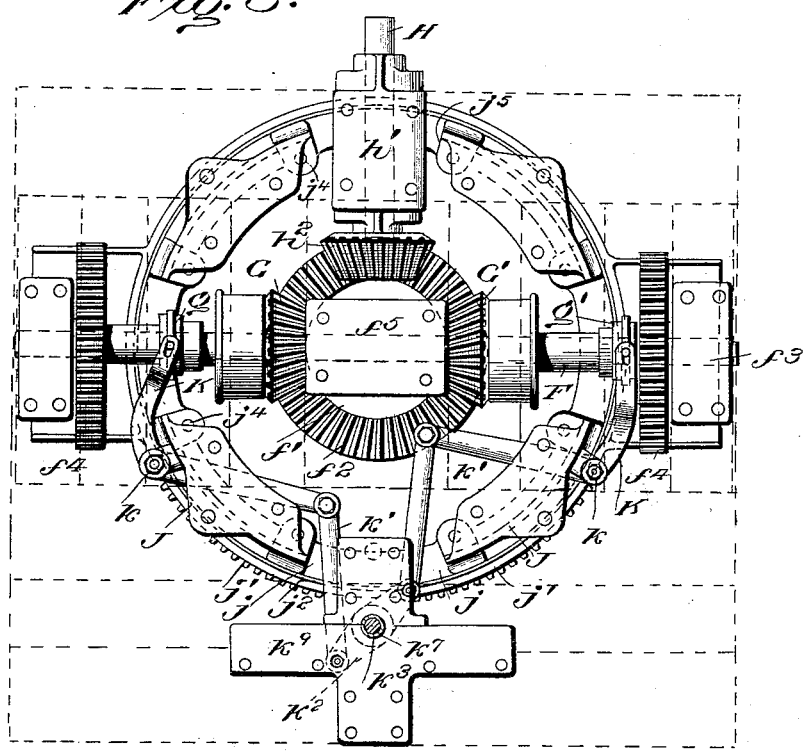

UNITED STATES PATENT OFFICE.

WILLIAM C. BARR, OF JERSEY CITY, NEW JERSEY.

MOTOR-VEHICLE TRUCK.

SPECIFICATION forming part of Letters Patent No. 618,244, dated January 24, 1899.

Application filed July 19, 1898. Serial No. 686,321. (No model.)

*To all whom it may concern:*

Be it known that I, WILLIAM C. BARR, of Jersey City, in the county of Hudson and State of New Jersey, have invented certain new and useful Improvements in Motor-Vehicle Trucks; and I do hereby declare the following to be a full, clear, and exact description of the invention, such as will enable others skilled in the art to which it appertains to make and use the same.

This invention contemplates certain new and useful improvements in trucks for motor-vehicles.

The objects of the invention are, first, to provide for operating all four wheels of the vehicle instead of only two wheels, thus increasing the driving capacity; secondly, to provide simple and efficient means for changing the direction of travel of the vehicle without interfering with the motor; thirdly, to provide means for easily steering the vehicle; fourthly, to allow a vertical movement of the front axle without interfering with the gearing, and, lastly, to simplify and strengthen the parts composing the fifth-wheel and frames to which the axles are connected.

The invention will be hereinafter fully set forth, and particularly pointed out in the claims.

In the accompanying drawings, Figure 1 is a vertical longitudinal sectional view. Fig. 2 is a transverse sectional view on line 2 2, Fig. 1. Fig. 3 is a plan view of the forward end of the truck.

Referring to the drawings, A designates the truck-frame, upon which is designed to be mounted any suitable motor. (Not shown.)

B is the front axle, and $b$ the rear axle, both being supported in suitable frames or hangers $b'$. Each of these hangers is provided with heavy coiled springs $b^2$. Upon these axles are positioned wheels C, preferably provided with clutch connections with said axles at the ends of the latter and also mounted in roller-bearings. These bearings, as well as the clutch connections, I do not deem it necessary to illustrate, since any preferred form may be employed.

The front axle B has keyed thereon a beveled wheel $e$, with which meshes a beveled wheel $e'$, mounted on a stud $e^2$, which projects rearwardly from a collar $e^3$, loose on said axle. A corresponding stud $e^4$ projects forwardly from the opposite side of this collar. Upon these studs are secured the lower tubular ends $e^5$ of a yoke $e^6$, which at its top supports a collar $e^7$, having a central bore $e^8$ and a spline $e^9$. With the lower end of this collar is formed a beveled pinion $e^{10}$, which meshes with the beveled wheel $e'$. Within bore $e^8$ fits a vertically-disposed shaft E, having a groove to accommodate spline $e^9$. This shaft E is held at its upper end within the hub $f$ of a horizontally-disposed wheel $f'$, having beveled teeth $f^2$ on its periphery.

F designates a horizontally-disposed shaft extended transversely across the truck-frame beneath the latter and supported at its ends by depending boxings $f^3$. Upon this shaft are keyed gear-wheels $f^4$, with which are designed to mesh the driving-wheels of a motor. (Not shown.) This shaft F is also supported adjacent to the longitudinal center of the truck by depending boxings $f^5$, bolted to the under side of frame A.

Loose upon shaft F are beveled wheels G G', which are under the control of clutches $g$ $g'$ of any preferred construction. These clutches are so arranged and connected to their controlling mechanism that as one is operated to throw one of the wheels G G' into operation with shaft F the other wheel will be released. Since any preferred form of clutch may be employed, it is not necessary to describe the same in detail. The wheels G G' mesh with the beveled wheel $f'$, and, according to the wheel locked with shaft F, the said wheel $f'$ is rotated either to the right or the left. In this way power is transmitted to the front axle B. If the wheel G be locked to shaft F, the vehicle will be caused to travel forward, provided the power-wheels meshing with wheels $f^4$ are correspondingly rotated, and upon releasing wheel G and locking wheel G' with shaft F the vehicle will be caused to travel backward.

H designates a horizontally-disposed shaft mounted in boxings $h'$, depending from frame A and having keyed on its forward end a beveled wheel $h^2$, which constantly meshes with wheel $f'$. To the rear end of this shaft H is connected, by means of a universal coupling $h^3$, the upper forward end of an inclined shaft I, which at its lower rear end is mounted in a boxing $i$, held by brackets $i'$ on axle $b$. Upon the extreme rear end of this shaft I is a beveled gear-wheel $i^2$, which meshes with a vertically-disposed beveled gear-wheel $i^3$, fast on axle $b$. In this way power is applied directly to the rear axle. The shaft I is preferably formed in two parts united together by a telescopic joint $i^4$, which is held to one of the parts by bolt $i^5$. This coupling of the two parts of the shaft allows the latter to give to a limited extent and avoids breaking thereof under strain.

J designates a circular frame bolted at its top to the under side of frame A and supporting at its lower end a ring $j$, forming part of and coacting with a fifth-wheel $j'$. The latter is also circular; but its diameter is larger than the ring $j$, which fits therein. A continuous groove $j^2$ is formed between the ring $j$ and fifth-wheel ring $j'$ by beveling the opposed faces of said rings. Within this groove $j^2$ are placed balls $j^3$, which form the bearings for the ring $j$. The fifth-wheel ring $j'$ is supported at opposite sides by the hangers $b'$, which carry the boxings of the front axle B. The ring $j$ is secured to frame J by nutted bolts $j^4$, passed through ears $j^5$, projecting from said frame and ring. This ring is also provided with ears $j^6$, to which are bolted keeper-plates $j^7$, having lower flanged ends which fit beneath an inner continuous flange $j^8$ of the fifth-wheel ring $j'$. Thus it will be seen that the front axle and fifth-wheel can readily turn concentrically to shaft E without interfering with any of the power-transmitting mechanism.

K K designates levers for controlling the clutches $g$ $g'$. These levers are fulcrumed at $k$, and to their inner ends are connected links $k'$, which at their outer ends are pivotally united to the ends of an arm $k^2$, mounted centrally on the lower end of a tubular shaft $k^3$, extending upward through frame A and supported by a casting $k^4$ on the latter and also by inclined braces $k^5$. To the upper end of this tubular shaft $k^3$ is secured a hand-wheel $k^6$, by turning which the clutches may be operated. Through the tubular shaft $k^3$ extends a spindle $k^7$, which is controlled by a hand-wheel $k^8$, located just above wheel $k^6$. The lower end of this spindle $k^7$ extends beneath the tubular shaft $k^3$ and is supported at its lower end by a hanger $k^9$, bolted to the under side of frame A. On this spindle are keyed large and small gear-wheels $k^{10}$, which mesh, respectively, with small and large gear-wheels $k^{12}$, fast on a shaft $k^{13}$, the ends of which fit in opposite openings in ring $j$ and an overhanging portion of hanger $k^9$. Also on this spindle $k^7$ is a gear-wheel $k^{14}$, which meshes with teeth formed on the circumference on the fifth-wheel ring $j'$. Hence by turning spindle $k^7$ the vehicle may be steered in the desired direction.

From what has been said it will be seen that the power communicated by the motor is applied directly to both the front and rear axles. By allowing the vertically-disposed shaft E to move up and down within collar $e^i$ the front axle may move up and down without interfering with the operation of the mechanism. The intermediate gear-wheel $e'$ allows of this up-and-down movement and still maintains the integrity of the gearing with axle B.

I claim as my invention—

1. A motor-vehicle truck having a main operating-shaft, a train of gearing between said shaft and the axle of the front carrying-wheels, a gear-wheel on the axle of the rear carrying-wheels, and a shaft rotatable by said train of gearing and having at one end a gear-wheel meshing with the said gear-wheel on the axle of the rear carrying-wheels, substantially as set forth.

2. A motor-vehicle truck having a main operating-shaft, gear-wheels on the axles of the front and rear carrying-wheels, a horizontally-disposed gear-wheel driven by said operating-shaft, and two shafts having gear-wheels on their outer ends meshing with the gear-wheels on said axles, both of said shafts being driven by said horizontally-disposed gear-wheel, substantially as set forth.

3. A motor-vehicle truck having a main operating-shaft, gear-wheels thereon, means for clutching said wheels to said shaft, a horizontally-disposed gear-wheel with which said former wheels engage, a train of gear-wheels carried by the axle of the front wheel, and a shaft keyed to said horizontally-disposed gear-wheel and having a sliding connection with one of the gear-wheels of the said train of gear-wheels, substantially as set forth.

4. A motor-vehicle truck having a main operating-shaft, gear-wheels thereon, means for clutching said wheels to said shaft, a horizontally-disposed gear-wheel with which said former wheels engage, a beveled gear-wheel on the axle of the front carrying-wheels, an intermediate wheel intermeshing therewith, a second beveled wheel meshing with said intermediate gear-wheel, a shaft depending from said horizontally-disposed gear-wheel having a spline connection with said second gear-wheel, substantially as set forth.

5. The combination with the main operating-shaft having beveled gear-wheels thereon, and means for clutching said wheels on said shaft, of a horizontally-disposed beveled gear-wheel with which said former wheels engage, a shaft having a gear-wheel meshing with said horizontally-disposed wheel, a rearwardly-extended shaft coupled to the latter shaft and having a gear-wheel on its rear end, and a gear-wheel on the axle of the rear carrying-wheels with which the latter gear-wheel meshes, as set forth.

6. The combination with the main operating-shaft having beveled gear-wheels thereon, and means for clutching said wheels on said shaft, of a horizontally-disposed beveled gear-wheel with which said former wheels engage, a depending shaft carried by said horizontally-disposed wheel, a beveled gear-wheel splined on said latter shaft, a gear-wheel fast on the axle of the front carrying-wheels, an intermediate gear-wheel carried by said axle, a short shaft having a beveled gear-wheel meshing with said horizontally-disposed wheel, an extensible shaft coupled to said short shaft and having a beveled gear-wheel on its rear end, and a beveled gear-wheel on the axle of the rear carrying-wheels meshing with said latter wheel, substantially as set forth.

7. The combination with the truck-frame, the main operating-shaft, and the gearing connecting the latter with the axle of the front carrying-wheels, of a circular frame depending from said truck-frame having a ring on its lower end, a fifth-wheel mounted on said axle having a ring inclosing said former ring, and ball-bearings interposed between said rings, substantially as set forth.

8. The combination with the truck-frame, the main operating-shaft, and the gearing connecting the latter with the axle of the front carrying-wheels, of a circular frame depending from said truck-frame having a ring on its lower end, a fifth-wheel mounted on said axle having a ring inclosing said former ring, ball-bearings interposed between said rings, and keeper-plates secured to said former ring and engaging the fifth-wheel ring, as set forth.

9. The combination with the truck-frame, the main operating-shaft, and the gearing connecting the latter with the axle of the front carrying-wheels, of a circular frame depending from said truck-frame, a fifth-wheel held to the lower end of said circular frame having teeth on its periphery, a spindle having a gear-wheel meshing with said teeth, and a hand-wheel on its upper end, substantially as set forth.

In testimony whereof I have signed this specification in the presence of two subscribing witnesses.

WILLIAM C. BARR.

Witnesses:
WM. H. SEEBECK,
TIMOTHY F. COCHRAN.